United States Patent [19]

Murakami et al.

[11] 4,006,934
[45] Feb. 8, 1977

[54] SEAT FOR AUTOMOBILE

[75] Inventors: Hisakazu Murakami; Yasuhiko Fujiwara, both of Yokohama, Japan

[73] Assignee: Nissan Motor Co., Ltd., Yokohama, Japan

[22] Filed: July 2, 1975

[21] Appl. No.: 592,798

Related U.S. Application Data

[63] Continuation-in-part of Ser. No. 447,367, March 1, 1974, abandoned.

[30] Foreign Application Priority Data

Mar. 2, 1973  Japan .............................. 48-25496

[52] U.S. Cl. .............................. 297/386; 297/389
[51] Int. Cl.² .......................................... A47C 31/00
[58] Field of Search .......... 297/216, 385, 386, 389; 280/150 SB; 248/430

[56] References Cited

UNITED STATES PATENTS

| 3,524,677 | 8/1970 | Louton | 297/216 |
| 3,639,000 | 2/1972 | Keltner | 297/386 |

FOREIGN PATENTS OR APPLICATIONS

| 1,258,697 | 3/1961 | France | 297/386 |

Primary Examiner—James C. Mitchell

[57] ABSTRACT

A preload device for a harness is mounted fixedly to a motor vehicle seat and the harness is also fixed to the seat, so that relative relation between the harness and the seat is constant irrespective of longitudinal adjustment of the seat with respect to floor of motor vehicle.

7 Claims, 6 Drawing Figures

SEAT FOR AUTOMOBILE

This application is a continuation-in-part application of our pending application Ser. No. 447,367, filed on Mar. 1, 1974 and now abandoned.

The present invention relates to a motor vehicle seat.

It is well recognized that the use of seat belts can greatly reduce the incident of injuries in the event of collision of a motor vehicle and reduce their severity. Generally, in the case of an automobile, seat belts encircle the torso of an occupant with the terminal ends of the belts secured to a relatively unyielding fixed part of the automobile by means of a mounting device of the type having an energy absorbing character. However such installations of seat belts exhibits the following shortcomings.

For the first, an occupant has to adjust the length of a seat belt so that it could serve a restraining function in the event of a collision whenever a seat is adjustably displaced along the longitudinal direction of the automobile.

For the second, such a part of the automobile body where the seat belt will be secured has to be reinforced.

For the third, the complexity of the manufacturing of automobiles has increased. The present invention aims at obviating the above mentioned shortcomings.

It is an object of the present invention to provide an automobile seat adapted to be provided with a harness for the seat occupant.

It is a further object of the present invention to provide an automobile seat having mounted therein means so constructed and arranged as to mount a harness associated therewith, whereby the appearance of the seat will not be impaired.

The other objects, features and advantages of the present invention will become apparent from the following description with reference to the accompanying drawings, in which.

Figure 1:
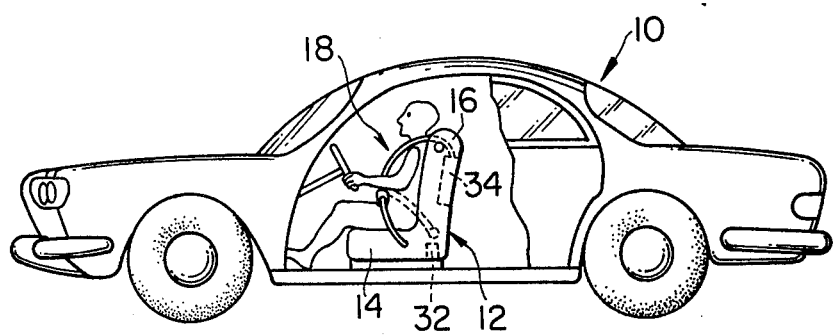
FIG. 1 is a diagrammatic side view of an automobile partly broken away and a seat having a harness associated therewith and showing a first preferred embodiment of the present invention.

Referring to the drawings, FIG. 1 illustrates an automobile 10 having a seat 12. The seat is mounted on a floor board (no numeral) in a conventional manner so that it will slide adjustably in the longitudinal direction of the motor vehicle. The seat 12 has a generally horizontal seat portion 14 and a back supporting portion 16 and is provided with a safety harness 18 for the seat occupant (no numeral).

Figure 2:
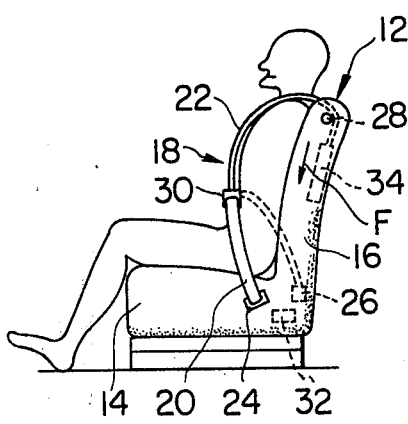
FIG. 2 is an enlarged view of the seat shown in FIG. 1.
Figure 3:
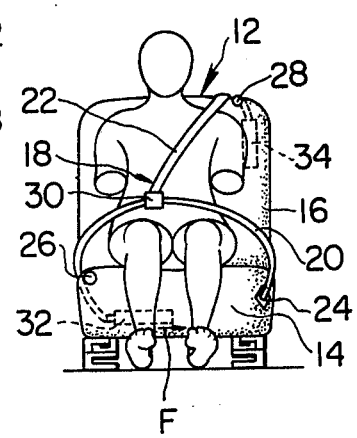
FIG. 3 is a front view of the seat shown in FIG. 1.

The safety harness 18 which is constructed in a conventional manner includes a lap strap 20 and a shoulder strap 22. The harness 18 has one end secured to the horizontal seat portion 14 at 24. A sheave 26 is mounted on the horizontal seat portion 14 and another sheave 28 is mounted on the back supporting portion 16. The lap strap 20 extends through the sheave 26 into the horizontal seat portion 14 and the shoulder strap 22 through the sheave 28 into the back supporting portion 16, as shown in FIGS. 1, 2 and 3. Reference numeral 30 is a conventional coupling means. The other terminal end of the lap strap 20 and the upper terminal end are held stationary relative to the seat 12 by suitable means which are mounted within the horizontal seat portion 14 in the illustrated position 32 and within the back supporting portion 16 in the illustrated position 34. Each such means is operable to tighten the harness 18 on the seat occupant in the event of a collision of the automobile 10.

Figure 5:
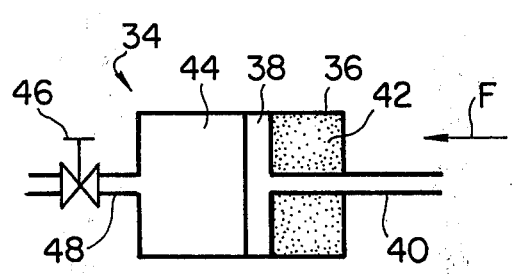
FIG. 5 is a diagrammatic sectional view of a device adapted to hold the associated harness stationary relative to the seat shown in FIGS. 1 through 3.

Referring to FIG. 5, there is shown a cylinder 36 which is used in the seat 12 as mounted within the horizontal seat portion 14 in the illustrated position 32 and within the back supporting portion 16 in the illustrated position 34. A piston 38 in the cylinder 36 has a piston rod 40. The cylinder 36 and the piston rod 40 define on one side of the piston 38 a generally annular chamber 42 which is filled with a pressurized gas; and the cylinder 36 defines on the opposite side of the piston 38 a chamber 44 which is filled with a hydraulic oil or which may be filled with a pressurized gas, if desired. The piston 38 is normally in the illustrated position and the piston rod 40 will be fixed to the upper terminal end of the shoulder harness 22 or one terminal end of the lap strap 20.

In order to tighten the corresponding portion of the harness 18 a relief valve 46 is provided in a drain conduit 48 which is in open communication with the chamber 44. The relief valve 46 is schematically shown in the drawing but should be so constructed and arranged as to normally prevent free flow through the drain conduit 48 and to permit free flow therethrough in the event of a collision of the automobile 10.

In operation, when the relief valve 46 is opened to permit hydraulic oil out of the chamber 44 in the event of collision of the automobile 10 the piston 38 will move in the direction indicated at arrow F due to the pressure gradient across the piston 38, or by the force of gas within the generally annular chamber 42. This movement will tighten the associated terminal end of the harness 18.

It will be noted that if the chamber 44 is filled with the pressurized gas instead of hydraulic oil more rapid movement of the piston 38 is possible upon the opening of relief valve 46 since the gas generally has lower viscosity.

Figure 4:
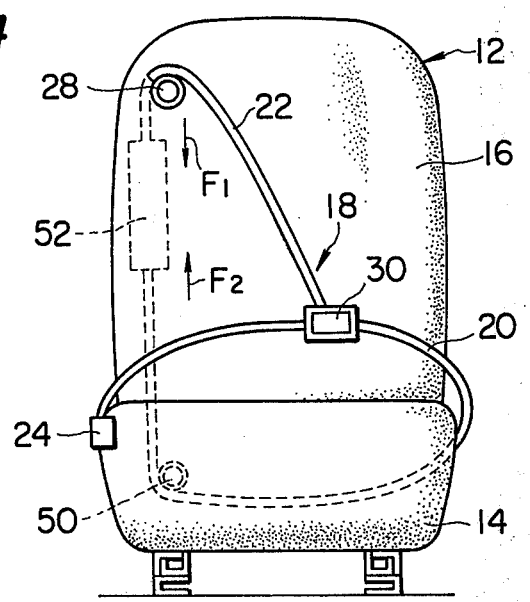
FIG. 4 is a similar to FIG. 2 showing a second preferred embodiment of the present invention.
Figure 6:
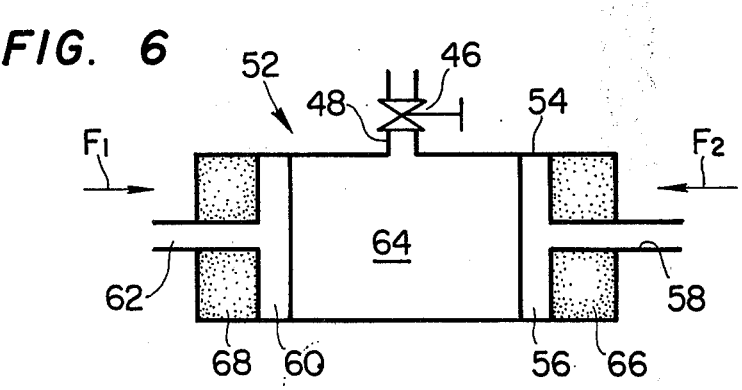
FIG. 6 is a diagrammatic sectional view of a device adapted to hold the associated harness stationary relative to the seat shown in FIG. 4.

Referring to FIGS. 4 and 6, a lap strap 20 has one end secured to horizontal seat portion 14 at 24. Sheave 50 is provided within the horizontal seat portion 14. The lap strap 20 extends through the sheave 50 vertically as shown. The shoulder strap 22 extends through sheave 28 in a similar manner to FIG. 3. The other terminal end of the lap strap 20 and the upper terminal end of the shoulder harness 22 are held stationary relative to seat 12 by a single means which is mounted within the back supporting portion 16 in the illustrated position 52.

Referring particularly to FIG. 6 a first piston 56 in cylinder 54 has a piston rod 58 and a second piston 60 has a piston rod 62. The pistons 56 and 60 define therebetween a chamber 64 filled with a hydraulic oil or if desired may be filled with a pressurized gas, the cylinder 54 and the piston rod 58 define a first generally annular chamber 66 which is filled with pressurized gas, and the cylinder 54 and the piston rod 62 define a second generally annular chamber 68 which is also filled with a pressurized gas. The first piston rod 58 is fixed to the lap strap 20 and the second piston rod to the shoulder harness 22. A relief valve 46 is mounted in drain conduit 48 which permits open communication of the chamber 64 with the atmosphere.

In the event of a collision the relief valve 46 opens and fluid flows out of the chamber 64 and due to pressure differences created across the first and second pistons 56 and 60 respectively, these pistons will move in the directions indicated by arrows $F_1$ and $F_2$. Since the harness 18 is operatively connected to the rods of the pistons 56 and 60, the safety harness 18 will be tightened upon movements of the pistons 56 and 60.

The advantages of the present invention are as follows:

1. Without any modification of conventional seat guide and clamp mechanism, the seat according to the present invention can be mounted on the floor of the automobile.
2. Since the harness tightening device can be mounted within the seat during the manufacture of the seat unit, the complexity of the installation of the harness is considerably reduced.
3. It is not necessary to provide a reinforced part in the automobile for the harness.
4. As the tightening device is mounted within the seat, the appearance of the seat is not impaired.

Although the present invention has been described in association with a harness having three terminal ends, the present invention can be associated with a harness having two terminal ends.

What is claimed is:

1. In a motor vehicle having a seat including a generally horizontal portion and a back supporting portion, said seat being mounted to the motor vehicle so that it will slide adjustably in the longitudinal direction thereof, the combination with said seat, of a harness and a means for tightening said harness on the seat occupant, said tightening means being mounted fixedly to and within said seat and said harness being fixed to said seat and operatively connected to said tightening means, said harness having first, second, and third terminal ends said first terminal end being secured to said horizontal portion, said tightening means including a first means mounted within said horizontal portion and so constructed as to normally hold the second terminal end stationary relative to the seat; and a second means mounted within said back supporting portion and so constructed as to normally hold the third terminal end stationary relative to the seat, each of said first and second means being adapted to tighten said harness on the seat occupant.

2. The combination as claimed in claim 1, wherein each of said first and second means includes a cylinder, a piston slidable in said cylinder having a piston rod, said cylinder and said piston rod defining in said cylinder on one side of said piston a generally annular pressurized gas chamber, said cylinder defining in said cylinder on the opposite side of said piston a fluid chamber, a drain conduit in open communication with said fluid chamber, a normally closed relief valve in the drain conduit preventing flow therethrough.

3. The combination as claimed in claim 2, wherein the fluid chamber of said each means is filled with a hydraulic oil.

4. The combination in claim 2, wherein the fluid chamber of said each means is filled with a pressurized gas.

5. In a motor vehicle having a seat including a generally horizontal portion and a back supporting portion, said seat being mounted to the motor vehicle so that it will slide adjustably in the longitudinal direction thereof, the combination with said seat, of a harness and a means for tightening said harness on the seat occupant, said tightening means being mounted fixedly to and within said seat and said harness being fixed to said seat and operatively connected to said tightening means, said harness having first, second, and third terminal ends, the first terminal end being secured to said horizontal portion, said tightening means being in the form of a single means mounted within said back supporting portion and so constructed as to normally hold the second and third terminal ends stationary relative to the seat, said single means being adapted to tighten said harness on the seat occupant.

6. In a motor vehicle having a seat including a generally horizontal seat portion and a back supporting portion, said seat being mounted to the motor vehicle so that it will slide adjustably in the longitudinal direction thereof, the combination with said seat of:
a safety harness having a lap strap and a shoulder strap, said lap strap having one end secured to one side of said horizontal seat portion and extending into said horizontal seat portion and through a sheave mounted on the opposite side of said horizontal seat portion, said shoulder strap extending from said lap strap into said back supporting portion of said seat through a sheave mounted within said back supporting portion; and means mounted within said back supporting portion of said seat and connected with said the other end of said lap strap and with the other end of said shoulder strap for tightening said lap strap and said shoulder strap on the seat occupant.

7. The combination as claimed in claim 6, wherein said means includes a cylinder, a first piston slidable in said cylinder having a piston rod, a second piston slidable in said cylinder having a piston rod, said cylinder and the piston rod of said first piston defining a first generally annular pressurized gas chamber within said cylinder, said cylinder and the piston rod of said second piston defining a second generally annular pressurized gas chamber, said pistons defining therebetween a fluid chamber which defines the rest position of said pistons, a drain conduit in open communication with said fluid chamber, a normally closed relief valve in said drain conduit preventing flow therethrough and permitting free flow therethrough when opened.

* * * * *